March 30, 1965  A. B. LEVINE  3,175,383
MAGNETIC PROCESSES
Filed Jan. 16, 1963
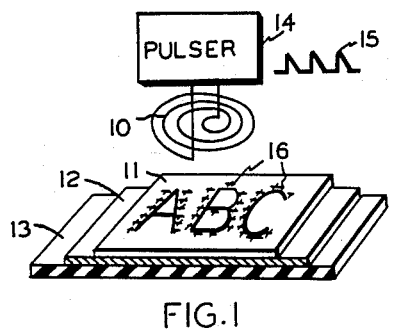
FIG.1
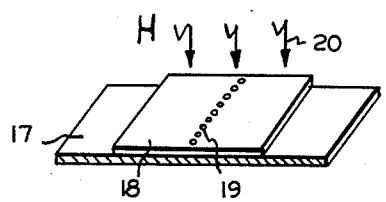
FIG.2
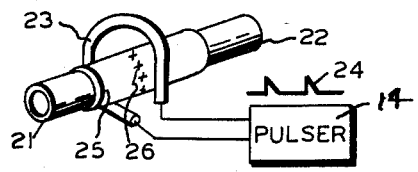
FIG.3
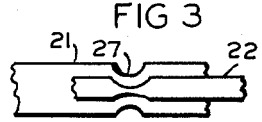
FIG.4
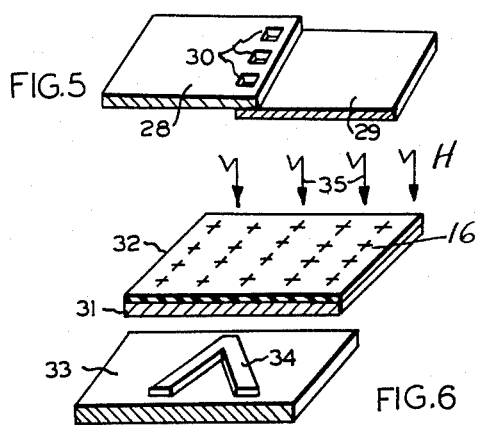
FIG.5
FIG.6
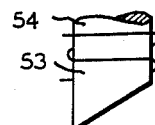
FIG.9
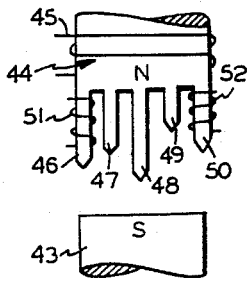
FIG.8
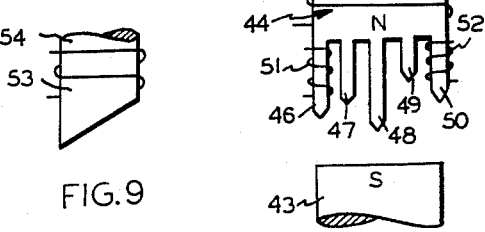
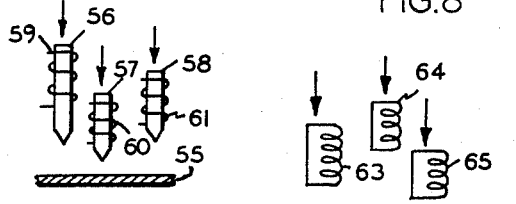
FIG.10
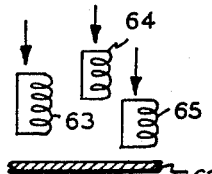
FIG.11
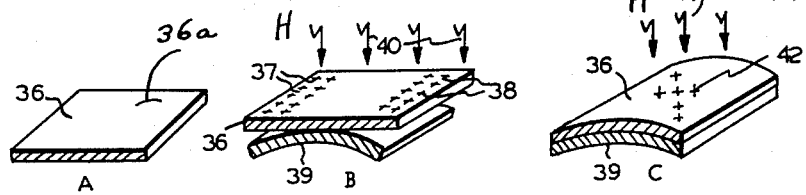
FIG.7
INVENTOR
ALFRED B. LEVINE
BY Paris, Haskell, and Levine
ATTORNEYS

United States Patent Office 3,175,383
Patented Mar. 30, 1965

3,175,383
MAGNETIC PROCESSES
Alfred B. Levine, 2924 Terrace Drive, Chevy Chase, Md.
Filed Jan. 16, 1963, Ser. No. 251,931
26 Claims. (Cl. 72—56)

This invention generally relates to methods of dynamostatically and dynamagnetically working metals and other materials by the use of changing magnetic fields and more particularly to methods of selectively forming, shaping, embossing, severing and otherwise working such materials into predetermined shapes, patterns, and spatial configurations.

The term dynamostatically as used herein is intended to include the production of dynamic forces generated by the interaction of magnetic fields with electric currents or electrostatic charges. As is known in the electrical arts, when a magnetic field is applied to an electrical current carrying conductor, an interaction force is produced that is proportional to the intensity of the magnetic field and to the amplitude of the electrical current. In a similar manner when an electrostatic charge is subjected to a changing magnetic field, an interaction force is produced that is proportional to the charge and to the rate of change of the magnetic field.

The term dynamagnetically as used herein is intended to include the production of dynamic forces being generated by the application of changing magnetic fields to electrically conductive materials, such as metals. As is known in the electrical arts, a changing magnetic field induces a circulating electrical current in a conductor and a resulting interaction force is produced between the induced circulating currents and the magnetic field that is proportional to the rate of change of the field. This term is also intended to include the force reactive interaction of a magnetic field with a superconductive material which produces what may be termed as a magnetic pressure force. The phenomena is more fully described in Patent 3,005,117.

According to the present invention, there is provided a number of related processes for variously working or severing metals and other materials into a variety of different shapes and configurations by the application of dynamostatically and dynamagnetically produced forces.

According to one of the dynamostatic embodiments, different predetermined shapes and configurations of the metal and nonmetal workpieces are obtained by producing predetermined patterns of electrostatic charges on the workpieces and then subjecting the workpieces to changing magnetic fields in force reactive relationship with the charges. By the preselection of desired charge patterns on the workpiece, either intricate or simple shaping or working of the workpieces can be produced as might be desired. According to other embodiments of the dynamostatic process, a predetermined spatial pattern of forces is obtained by applying a uniform pattern of electrostatic charges to the workpiece and applying a nonhomogenous magnetic field in the desired pattern or configuration to the charged member. In still other embodiments of the dynamostatic process, both the magnetic field and the electrostatic charges are produced in a desired pattern and are force interacted to selectively form or work the workpiece into the shapes or forms desired.

According to one of the dynamagnetic processes of the present invention, there is also provided methods for the forming of the workpieces into either intricate or simple shapes by producing controlled patterns or spatial configurations of the forces acting upon the workpiece. According to one embodiment, where the workpiece is of either a nonmetal or a metal, a predetermined patterned mask made of a more highly electrical conductive material than the workpiece is applied thereto, and the workpiece is subjected to a changing magnetic field. In the more highly conductive mask, a greater circulating current is induced than in the workpiece with the result that a selective pattern of forces is exerted on the workpiece following the configuration of the mask. Alternatively, if the workpiece is of a highly conductive material, the mask may be eliminated and the changing magnetic field may be produced in a desired nonhomogenous fashion to produce a desired selective pattern of forces on the workpiece.

According to still further embodiments of the invention, both the dynamostatic and dynamagnetic processes may be applied to the shaping or working of superconductive materials or may employ superconductive magnets or masks to obtain the shaped pattern of selective forces to be applied to the workpieces. In these latter embodiments, the processes are performed at cryogenic temperatures, close to absolute zero, and therefore necessitative considerable auxiliary low temperature cooling equipment. On the other hand, superconductive magnets are capable of carrying substantially infinite electrical currents and therefore capable of producing magnetic fields having intensities considerably greater than can otherwise be obtained. For this reason, the use of superconductive materials in the processes of the present invention is desired where the magnitude of the forces required to shape the workpieces are large.

In many of the different process embodiments of the present invention, mechanical dies and forms and other conventional mechanical shaping means may conjunctively be employed together with the dynamostatic or dynamagnetic force producing steps in the selective forming of the workpieces.

It is accordingly a principal object of the invention to provide processes for the forming or working of metal and other materials employing magnetic fields and electrostatic charges exclusively.

A further object is to provide such processes producing a predetermined selective pattern of shaped forces that may be intricate in nature for precision working of parts, or less intricate as may be desired.

A still further object is to provide such processes that are very rapid in operation and capable of mass producing the shaping of workpieces at high speed.

Another object is to provide processes for dynamostatically working and shaping metals and nonmetals.

Still another object is to provide processes for dynamagnetically working and shaping metals and nonmetals.

A further object is to provide processes for dynamagnetically working and shaping superconductive materials.

Another object is to provide processes for dynamagnetically working and shaping materials in predetermined configurations using superconductive magnets and/or superconductive masks.

A still further object is to provide processes for shaping and working materials at cryogenic temperatures.

Other objects and additional advantages will be more readily understood by those skilled in the art after a detailed consideration of the following specification taken with the accompanying drawing wherein:

FIG. 1 is a schematic representation of one preferred process according to the invention for dynamostatically embossing a sheet of metal or other conductive material.

FIG. 2 is a schematic representation of a preferred process for dynamagnetically severing a metal sheet.

FIG. 3 is a schematic representation of a preferred process for dynamostatically joining two coaxial hollow tubes by crimping the tubes together, and, FIG. 4 is a sectional view of the joined tubes of FIGURE 4 after processing.

FIG. 5 is a perspective view of two flat plates joined together by the dynamagnetic or dynamostatic processes of the present invention.

FIG. 6 schematically illustrates another preferred process for embossing a plate member in a predetermined configuration employing a topographically contoured mechanical die member.

FIG. 7 schematically illustrates still another preferred process for both initial shaping a member and then embossing the member in a squential series of steps according to the present invention, and FIGS. 8 to 11 schematically illustrate a number of differently constructed magnet configurations for producing nonhomogeneous magnetic fields for use in various other modifications of the present invention.

Referring now to the drawings, there is shown in FIGURE 1, a dynamostatic process according to the invention for embossing a sheet 12 of metal or other material in a desired pattern 16 being illustrated as the alphabetical letters ABC. As shown, the sheet 12 is supported on a resilient base member 13 of rubber or the like, and over the metal sheet 12 is disposed a thin flexible layer 11 of a suitable dielectric material, capable of supporting an electrostatic charge, such as the plastic material Mylar. An electrostatic charge pattern is then applied to the upper layer 11 in the configuration 16 that it is desired to emboss the metal sheet 12, and to support this charged pattern 16, the metal workpiece sheet 12 may be electrically grounded, not shown.

For producing the forces to selectively deform or emboss the workpiece 12 in this pattern, a rapidly changing magnetic field is then applied to the electrostatically charged layer 11 by such means as electrically pulsing a suitably oriented winding 10 by a series of high intensity electrical pulses 15 produced by a pulser source 14.

The waveshape of the pulses 15 is preferably such that each pulse has a greater rate of change at its leading edge than at the trailing edge thereof, or the reverse, whereby the electrostatic charge pattern 16 is subjected to a greater rate of change of the magnetic field in one direction than in the other. As generally discussed above, the force reactive relationship between the electrostatic charges and the changing magnetic field exerts a force on the charged pattern 16. By suitably orienting the winding 10 with respect to the charges, this force may be directed downwardly and transmitted through the layer or flexible membrane 11 to bear against the workpiece 12, and by the repetitive application of magnetic pulses of sufficient rate of change of intensity, this downward force may be made sufficient to deform or emboss the metal sheet workpiece 12 which can yield against the resilient supporting base 13.

Since this dynamostatic force is produced only at those discrete positions on the workpiece 12 where an electrostatic charge pattern 16 was initially applied to the dielectric layer 11 the charge pattern defines the spatial pattern of embossing. Consequently by varying the pattern of electrostatic charge 16 on the layer 11, as desired, a considerable variety of different shapes or configurations of the workpiece 12 can be obtained.

As noted above, the electrical pulses being applied to the winding 10 are asymmetrical, having a greater rate of change in one direction than the other. The reason for this is the fact that a changing magnetic field in one direction reacts with the electrostatic charges to produce a downward force as is desired whereas a changing magnetic field in the opposite produces an undesired upward force against the charges. Since the magnitude of the force being produced is proportional to the rate-of-change of the magnetic field; and since in this example, it is desired to produce a much greater downward force against the workpieces than an upward force, the waveshape of the pulses 15 are adjusted to change very rapidly in the desired direction and much more slowly in the opposite direction.

FIGURE 2 generally illustrates one embodiment of a dynamagnetic process according to the invention for shaping or severing a workpiece 17 of sheet metal or other material in a desired pattern or configuration. This workpiece 17 is also supported on a resilient base member, such as base 13 in FIGURE 1, and disposed over the workpiece 17 there is provided a thin layer or membrane 18 of nonconducting material for supporting a mask 19 having the desired pattern. In this illustration, the mask 19 or pattern is comprised of thin dots of a metal such as silver, having a much higher electrical conductivity than the electrical conductivity of the workpiece, which may be of iron, tin, or other lower conductivity material, or may be of plastic or other nonconductive material. As in the embodiment of FIGURE 1, the mask 19 and workpiece 17 are subjected to a rapidly changing magnetic field 20 which, in this case, induces a circulating electrical current in the metal mask dots 19, as well as in the workpiece 17, in the event that the workpiece is of electrical conducting material. The induced circulating current produces its own magnetic field which interacts with the field 20 in force reactive relationship to exert selective forces against the mask 19 and membrane 18, which forces are transmitted through the membrane against the workpiece 17, thereby to deform, emboss, or shape the workpiece 17 in the pattern of the mask 19. If the workpiece 17 is of an electrically conductive material, circulating currents are also induced therein by the changing magnetic field 20 and such currents interact with the field 20 to produce forces. However, since the electrical conductivity of the mask material 19 is considerably higher than that of the workpiece 17, larger circulating currents flow in the mask 19 and hence produce greater dynamagnetic forces on the workpiece in the pattern of the mask to selectively work or deform the workpiece as desired.

In this embodiment, it is contemplated that the highly conductive metal mask 19, may take various forms such as dots, strips, cut-out templets, or thin sheets of metal, all suitably configured in the pattern desired for forming the workpiece 17. The mask metal 19 should preferably be thin and flexible, as is its supporting membrane 18 so as to transmit the dynamagnetically produced forces therethrough to the workpiece.

Where the mask is made up of separate metal strips or of a template cut-out or formed of thin sheet metal, it may be supported directly on the workpiece without the need for the intermediate membrane 18. Alternatively, the mask may be variously fastened to or merely supported on the membrane 18 as previously described. Still other variations are contemplated by the invention. In one, the mask may be formed by depositing or evaporating metal on the membrane in the desired configuration, or by a process of involving etching of a thin metal layer, both of which are well known in the art of manufacturing printed circuits as are other printed circuit techniques.

Where it is desired to sever or break the workpiece in a desired pattern, this may be easily accomplished with workpieces of more brittle material, since the magnetic field change may be adjusted over a wide range in either the embodiment of FIGURES 1 or 2 to exceed the breaking strength of the workpiece material.

In a still further embodiment of the invention, the mask 19 and/or the magnet winding such as coil 10 may be formed of a superconductive material whereby the process is performed at cryogenic temperatures close to absolute zero. The changing magnetic field produces a magnetic pressure force against the superconductive mask of considerable intensity since a magnetc field cannot penetrate a superconductive material which possesses substantially infinite magnetic resistance or reluctance. This magnetic pressure force is of much greater intensity than the force that may be produced as a result of circulating currents in the workpiece with the result that a selective pattern of forces is exerted on the workpiece in the pattern of the mask.

It is known that a relatively large number of metallic elements become superconducting at varying temperatures for each material, as low as .35 degree Kelvin for the material hafnium up to about 8 degrees Kelvin for the element niobium. Some alloys become superconductive at even higher temperatures such as niobium nitride at 15.5 degrees Kelvin or niobium tin at 18 degrees Kelvin. Among the known superconductive elements that may be employed are Al, Zn, Ga, Zd, In, Sn, Hg, Tl, Tb, Ru, Re, Os, U, Th, Hf, Ta, Zr, Nb, B, T, and La, and various alloys of these materials, as well as certain alloys of elements which are not in themselves superconductive elements.

Although FIGURES 1 and 2 illustrate the embossing or deforming of flat sheet workpieces, the processes of the present invention may be applied in a variety of other applications and to variously otherwise shaped workpieces. For example, FIGURES 2 and 3 illustrate the application of the processes to the joining together of two tubes 21 and 22, and FIGURE 5 illustrates the joining together of two flat plates 28 and 29.

As shown in FIGURE 3, there is provided a dielectric membrane 25 that is wrapped around the joint of the tubes 21 and 22, and a circumferentially arranged ring of electrostatic charges 26 is applied to the membrane 25 at the desired joint area. A magnetic turn of cable 23 or other winding is also suitably arranged to apply a changing magnetic field against the charges 26 in such fashion that a circumferentially directed force is applied to the tube joint when the winding 23 is energized by the pulser 14. As indicated in FIGURE 4, this circumferential force deforms or crimps the outer tube 21 to the inner tube 22 to join these members at the crimped region 27.

In FIGURE 5, the process is essentially the same as in FIGURE 3 except that the members to be joined are flat plates instead of tubes. Here the pattern or mask (not shown) corresponding to the desired joint region 30, is applied over the overlapped plates 28 and 29, and a changing magnetic field is then applied to selectively deform or crimp the material of the upper plate 28 into the material of the lower plate. The crimped regions may be in the square dot-like pattern 30, as shown, or in any other pattern desired, as determined by the mask of electrostatic charges applied to the dielectric membrane.

The joining processes of FIGURES 3 and 5 may also be performed according to the process of FIGURE 2, by the use of a mask of more highly electrically conductive material, or superconductive material, which is applied over the membrane or dielectric layer 25 instead of the electrostatic charge.

FIGURE 6 illustrates a further embodiment of the invention employing a die member 33 having a topographically shaped contour 34 in the desired configuration in conjunction with the dynamostatic or dynamagnetic produced forces. In this case, the workpiece 31, in the form of a sheet or otherwise, is applied over the die 33 and a membrane 32 bearing a uniform electrostatic charge 16 is applied over the workpiece 31. The application of a changing field 35 to the electrostatic charge 16 produces a uniform force over the surface of the workpiece 31 thereby urging the workpiece against the die 33 and forming or embossing the workpiece in the topographical contour 34 of the die 33.

Instead of producing a uniform dynamostatic force as described, the steps may be varied by producing a patterned electrostatic charge, as in FIGURE 1 or a dynamagnetically produced patterned force by a mask as in FIGURE 2. In either latter case, the pattern of forces may be aligned with the topographical contour 34 of the die to enhance the embossing or shaping of the workpiece 31.

In all of the embodiments described above, the pattern or configuration in which it is desired to shape the workpiece is produced electrostatically by charges, electrically by a mask, or mechanically by the use of a die, and the changing magnetic field is applied in a homogeneous or uniform manner to the workpiece, thereby to react with these patterns and generate the same pattern of forces. According to further embodiments of the invention, the selectively generated forces may alternatively be produced by the use of a nonlinear or nonhomogeneous magnetic field applied to the workpiece in a predetermined pattern. For example, considering the embodiment of FIGURE 6 wherein a uniform charge is applied over the workpiece, the application of a spatially nonhomogeneous magnetic field will react with the charges only at the different positions of the workpiece where the changing magnetic field exists to produce dynamic forces only at such positions, thereby to shape the workpiece in the pattern of the magnetic field. Similarly, if a spatially nonhomogeneous magnetic field is applied to a uniform sheet of conductive material applied over a workpiece (not shown), circulating currents will be produced in the sheet only at the spatial positions where the changing magnetic field is present thereby to reproduce the nonhomogeneous magnetic field as a corresponding pattern of forces on the workpiece.

For producing such nonhomogeneous magnetic fields in the variously desired patterns, either a plurality of separate magnets may be employed, as illustrated in FIGURE 10, and variously energized and positioned with respect to the workpiece 55, or alternatively, a single magnet structure with variously configured or energized pole pieces may be employed, as is illustrated in FIG. 8 or FIG. 9.

Referring to FIGURE 10, the separate magnets 56, 57, and 58 may be disposed at different distances from the workpiece 55 to normally produce different magnetic intensities or flux densities at these different positions. For changing these magnetic fields to create the dynamostatic or dynamagnetic forces, these magnets may be individually energized by means of separate windings 59, 60, and 61. In this manner, a different changing magnetic field is produced at each position on the workpiece to create the pattern of forces desired. Alternatively, the magnets 56, 57 and 58 may be individually moved toward and away from the workpiece, as is indicated by the arrowed lines, to produce the changing magnetic fields, or the magnets may be both individually moved with respect to the workpiece and conjunctively energized by electrical pulses through the separate windings, if desired.

FIGURE 8 illustrates a unitary magnet construction for producing a nonhomogeneous magnetic field pattern. In this embodiment, one of the magnet poles 44 is provided with a plurality of projections 46, 47, 48, 49 and 50 of the same or different length, each of which may be provided with individual energizing windings, such as windings 51 and 52 shown on projections 46 and 50, respectively. A workpiece (not shown) positioned between the main poles 43 and 44 is subjected to a spatially nonhomogeneous magnetic field of different intensities at different positions in proportion to the distance of the magnetic pole projection confronting that position. For producing a rate of change of this magnetic field in the same spatial pattern, the individual windings on the magnet projections may be jointly or selectively energized and/or a main winding 45 disposed on the pole 44 may be energized, either or both producing the time change of the magnetic field pattern that is desired to shape the workpiece.

FIGURE 9 illustrates an alternative configuration of a magnetic pole 53 wherein the pole face is uniformly inclined away from the workpiece to produce a predetermined magnetic field pattern useful for uniformly bending a workpiece.

In both embodiments of FIG. 8 and FIG. 10, it is noted that the tips of the pole projections are preferably pointed. This is for the purpose of focusing the magnetic field at specific locations on the workpiece. However, it will be appreciated that otherwise configured pole faces may be employed to obtain the desired magnetic field patterns.

For the purpose of creating very high intensity magnetic fields, particularly in magnets of small size, a series of individual windings of superconductive material may be employed as is generally illustrated in the embodiment of FIG. 11. In this embodiment, the windings 63, 64, and 65 made of superconductive material are cooled to their superconductive state or condition and, therefore, possess substantially infinite electrical conductivity or current carrying capacity. These magnets, therefore, may be energized by high intensity electrical pulses to produce extremely large magnetic flux changes and thus create a selective pattern of high intensity fields at different locations with respect to the workpiece. This magnetic field pattern may also be time varied to create the desired dynamostatic or dynamagnetic forces on the workpiece 62 in the same pattern by moving the magnets 63, 64, and 65 toward and away from the workpiece as generally discussed above.

As is more fully described in Patent 3,005,117, permanent electromagnets may be created in superconductive materials by a process involving inducing an electrical current flow in a short circuited winding of superconductive material. The induced electrical current continues to flow in the short circuited winding due to the fact that the superconductive material possesses substantially infinite conductivity or, in other words, no electrical resistance. Thus in the embodiment of FIG. 11, the superconductive windings 63, 64, and 65 may be short circuited, as shown, and employed as permanent electromagnets to shape or configure the workpiece in a desired pattern. In this case, however, the changing magnetic field for creating the desired dynamostatic or dynamagnetic forces is obtained by mechanically moving the individual winding 63, 64, and 65 toward and away from the workpiece in the pattern desired by means of a suitable mechanical positioning system (not shown).

The processes of the present invention may be employed alone, or in various combinations, or in various time sequences to shape, conform or sever the workpieces in a variety of configurations. FIG. 7 illustrates one manner of sequentially applying the process of FIG. 1, for example, to initially bend a flat sheet 36 in the desired arcuate form of a base member 39, and then by means of further processing, obtain an embossing of the surface of the curved sheet 36.

Referring to FIG. 7A, the sheet 36 may initially be of metal or other electrical conductor material and having a thin coating or deposit 36a of a suitable dielectric material capable of supporting an electrostatic charge pattern 37 being applied over its upper surface. Alternatively, a separate dielectric membrane may be used as previously described.

As shown in FIGURE 7B, the sheet 36 is placed over a curved base support 39, and the electrostatic charge patterns 37 and 38 are selectively applied to those end portions of the surface of the sheet where it is desired to produce forces for bending the sheet about the form 39. After the workpiece 36 is prepared in this fashion, a changing magnetic field 40 is uniformly applied to the surface and operates in force reactive relationship with the sheet only at those positions where the electrostatic charge patterns 37 and 38 exist, thereby to shape the workpiece 36 about is base support member 39 as desired.

In the next sequence of operations, illustrated in FIG. 7C, the previously applied charge patterns 37 and 38 are removed and a new charge pattern 42 is applied to the dielectric coating or membrane 36a in the desired configuration to emboss the sheet. Again a uniform changing magnetic field 41 is applied to the workpiece, which in this case operates only on the new charge pattern 42 to selectively emboss the surface of the workpiece 36 according to the desired pattern 42.

In a similar manner, by the application of a successive series of operations involving different patterns, a workpiece may be shaped, embossed, severed and otherwise processed in a great variety of arcuate and planar configurations in both two and three dimensions as might be desired.

Although relatively few of the many possible embodiments of the invention have been illustrated and described, it is believed evident that many changes, variations, and combinations of the described steps may be made without departing from the spirit and scope of this invention. Accordingly, this invention is to be considered as being limited only by the following claims appended hereto.

What is claimed is:

1. A method of magnetically working a member of superconductive material, comprising the steps of: supporting the member, cooling the member to its superconducting condition, and subjecting the member to a changing magnetic pressure force having a sufficient rate of change to deform the member while maintaining the member in its superconductive state.

2. A method of metal working a member of superconductive material comprising the steps of: cooling the member to its superconductive state, supporting the member on a deformable base, and subjecting the surface of the member to a spatially nonhomogeneous magnetic field in the pattern desired to selectively deform the material in the desired pattern while maintaining the material in its superconductive state.

3. In the process of claim 2, the step of subjecting the member to a nonhomogeneous field being performed by producing a series of magnetic fields at the desired relative intensities, and applying said fields to different selected positions on said member to produce the desired relative magnetic pressures at different positions against said member.

4. In the process of claim 2, the step of deforming the member being performed by progressively increasing the intensity of the magnetic field.

5. In the process of claim 4, the step of progressively increasing the magnetic pressure being performed by pulsing the magnetic field by pulses having a greater rate of change in one direction than the other.

6. A method of magnetically contouring a yieldable member of superconductive material, comprising the steps of: supporting the member, cooling the member to its superconductive state, and subjecting different positions on the member to magnetic pressure forces having differing relative intensities corresponding to a desired configuration of the member to be obtained while the member is in its superconductive state.

7. In the method of claim 6, the additional step of progressively increasing the magnet pressure forces at different positions of the member to obtain a progressive deformation of the member into the desired contour.

8. In the method of claim 6, the step of subjecting the member to the magnetic pressure forces being performed by producing a magnetic field proximate the member and in magnetic pressure relationship therewith and repetitively pulsing said magnetic field.

9. A method of dynamagnetically contouring a superconductive member comprising the steps of: supporting the member, cooling the member to its superconductive state, subjecting the member to a magnetic pressure force selectively applied over its surface in a preselected spatial pattern of different intensities corresponding to the contour desired; said step of subjecting the member to the magnetic pressure force being performed by positioning a winding of superconductive material proximate the member and maintaining said member and winding in a superconductive state while applying electrical current energization to the winding.

10. In the method of claim 9, the step of applying energization to the winding being performed by electrically pulsing the winding to produce an impacting magnetic pressure force.

11. A method for dynamagnetically forming a superconductive member into a desired contour pattern in a sequence of successive operations comprising the steps of: supporting the member, cooling the member to its superconductive state, producing a magnetic field of a first predetermined spatial configuration and applying the field against the member to provide a magnetic pressure force for deforming the member in a first contour, and producing a second magnetic field of a different predetermined spatial configuration and subsequently applying the second field to the member for deforming the member in a second configuration, said member being maintained in a superconductive state while the magnetic field and second magnetic field are applied thereto.

12. A method for dynamagnetically contouring a superconductive member comprising the steps of: supporting the member, cooling the member to its superconductive state, positioning a series of permanent superconductive electromagnets in a predetermined configuration with respect to the member to provide magnetic pressure forces in a desired configuration, and contouring the member by decreasing the distance between the electromagnets and the member to increase the pressure forces sufficiently to deform the member, said contouring of the member being performed while the electromagnets and member are maintained in their superconductive state.

13. A method of selectively working a member at low temperatures in a desired configuration comprising the steps of: supporting the member, selectively disposing a a preconfigured pattern of a superconductive material on the member, cooling the superconductive material to its superconducting state, said material having a higher electrical conductivity than said member, and subjecting the member and material to a changing magnetic field of sufficient rate of change to selectively deform the member in the pattern of the superconductive material while maintaining the material in its superconductive state.

14. A method of dynamagnetically working a member in a desired configuration without a mechanical die comprising the steps of: supporting the member, selectively disposing on the member a preconfigured pattern of material corresponding to the desired configuration and having a higher electrical conductivity than that of the member, and subjecting the member and material to a changing magnetic field of sufficient rate of change to selectively deform the member in the pattern of the more highly conductive material.

15. A method of selectively severing a member in a desired pattern without a mechanical die comprising the steps of: subjecting the member to a rapidly changing magnetic field, disposing over the member a preselected configuration of material in the desired severing pattern and having a higher electrical conductivity than the member that functions in force reactive relationship with the changing magnetic field to exert concentrated forces on the member in the pattern desired, and supporting the member in such fashion that the concentrated forces produce separation of the material along the pattern.

16. A method of dynamostatically shaping a yieldable member comprising the steps of: applying to a surface of the member an electrostatic charge in a preselected configuration, supporting the member in such manner that forces selectively applied to the surface thereof at different positions permits the member to selectively yield at these positions, and creating the selective forces over the surface to shape the member by subjecting the electrostatically charged pattern to a rapidly changing magnetically field.

17. In the method of claim 16, the electrostatic charge being applied to the surface of the member in a nonuniform pattern configuration corresponding to the desired shape to be obtained, and the supporting of the member being performed by placing a resilient support base underneath the sheet.

18. In the method of claim 16, the electrostatic charge being applied to the member in a uniform pattern configuration, and the supporting of the member being performed by placing the member over a die having a topographical contour corresponding to the desired shape.

19. A method of dynamostatically shaping a member of electrically conductive material in a desired pattern comprising the steps of: applying a nonconducting material over the member, producing an electrostatic charge in the desired pattern on the nonconducting material, and subjecting the charged pattern to a changing magnetic field in force reactive relationship with the charge to selectively shape the member.

20. A dynamostatic method of shaping a yieldable sheet metal member into a desired configuration comprising the steps of applying an electrostatic charge pattern proximate the metallic surface of the member, supporting the member in such manner that forces selectively applied to the surface thereof at different positions permits the sheet metal to selectively yield at said positions, and creating the selective forces to shape the sheet in the desired configuration by producing a substantially unidirectionally changing magnetic field in force reactive relationship with the electrostatic charges.

21. In the process of claim 20, said changing magnetic field being nonuniformly produced and applied to the member in the desired configuration, and the electrostatic charges being uniformly applied to the member, and the supporting of the sheet being performed by placing a resilient support base beneath the sheet in deformable relationship thereto, thereby permitting selective deformation of the sheet in the pattern desired.

22. In the process of claim 20, both said changing magnetic field and said electrostatic charges being uniformly applied to the member, and the supporting of the member being performed by placing the member over a die having a preselected topographical contour corresponding to the desired configuration.

23. In the process of claim 20, said magnetic field being nonuniformly applied to the member in the desired configuration, said electrostatic charge being nonuniformly applied in the desired configuration, and the supporting of the sheet being performed by placing the sheet over a topographically contoured die member in the desired configuration, with the magnetic field, electrostatic charge, and topographically contoured die all being in alignment.

24. A method for dynamostatically forming a member of electrically conductive and yieldable material in a desired three dimensional pattern comprising the steps of: coating the surface of the conducting member with a layer of dielectric material, applying an electrostatic charge to the surface of the dielectric, and producing a changing magnetic field in force reactive relationship with the electrostatic charges to produce selective forces on the member.

25. A method for dynamostatically working a member in a desired pattern comprising: applying a dielectric material to the member in a configuration corresponding to the desired pattern, applying an electrostatic charge pattern to the dielectric material, and subjecting the electrostatically charged dielectric to a changing magnetic field in force reactive relationship with the electrostatic charge to selectively deform the member.

26. A method of dynamagnetically working a member in a desired configuration without a mechanical die comprising the steps of: supporting the member, selectively disposing on the member a preconfigured pattern of material corresponding to the inverse of the desired configuration and having a higher electrical conductivity than that of the member, and subjecting the member and material to a changing magnetic field of sufficient rate of change to selectively deform the member in the desired configuration.

References Cited by the Examiner

UNITED STATES PATENTS 2,976,907 3/61 Harvey et al. _____ 113—44
3,115,857 12/63 Pfanner _____ 113—44

OTHER REFERENCES

High-Energy-Rate Forming, Product Engineering; October 15, 1962; pages 91–93.

Magnetic Pulse Forming, by Brower, D. F., SAE, Paper No. 479B presented at the Automotive Engineering Congress, Detroit, Mich., January 1962.

CHARLES W. LANHAM, *Primary Examiner.*